United States Patent
Gunston

(10) Patent No.: US 7,281,627 B1
(45) Date of Patent: Oct. 16, 2007

(54) FORGED CHAIN LINK ASSEMBLY

(75) Inventor: Aden Michael Gunston, Glouchestershire (GB)

(73) Assignee: 4B Elevator Components, Ltd., East Peoria, IL (US)

( * ) Notice: Subject to any disclaimer, the term of this patent is extended or adjusted under 35 U.S.C. 154(b) by 0 days.

(21) Appl. No.: 11/355,305

(22) Filed: Feb. 15, 2006

Related U.S. Application Data

(63) Continuation-in-part of application No. 10/938,916, filed on Sep. 11, 2004, now Pat. No. 7,080,728.

(51) Int. Cl.
*B65G 17/06* (2006.01)

(52) U.S. Cl. ............... 198/853; 198/850; 198/851; 198/852

(58) Field of Classification Search ........... 198/850, 198/851, 852, 853; 474/213, 214, 215, 231
See application file for complete search history.

(56) References Cited

U.S. PATENT DOCUMENTS

| | | | | |
|---|---|---|---|---|
| 2,466,639 A * | 4/1949 | Focke et al. | .............. | 474/220 |
| 2,568,649 A * | 9/1951 | McIntosh et al. | ........... | 474/231 |
| 2,761,548 A * | 9/1956 | Long | .................. | 198/733 |
| 3,103,275 A * | 9/1963 | Rollins | ............... | 198/733 |
| 3,171,322 A * | 3/1965 | Kaplan | ............... | 411/60.1 |
| 3,171,533 A * | 3/1965 | Ferg | ................... | 198/731 |
| 3,225,897 A * | 12/1965 | Rollins | ............... | 198/734 |
| 3,667,341 A * | 6/1972 | Kaplan | ............... | 411/60.1 |
| 3,709,054 A * | 1/1973 | Montano | ............. | 474/220 |
| 3,738,478 A * | 6/1973 | Tourtellotte | ......... | 198/851 |
| 3,888,133 A * | 6/1975 | Krekeler | ............. | 474/223 |
| 4,324,437 A * | 4/1982 | Narang | ................. | 305/106 |
| 4,349,101 A * | 9/1982 | Eldred et al. | .......... | 198/851 |
| 4,493,680 A * | 1/1985 | Hoffmann | ........... | 474/230 |
| 4,494,945 A * | 1/1985 | Ogino | ................. | 474/231 |
| 4,756,404 A * | 7/1988 | Maag et al. | ........... | 198/731 |
| 4,864,936 A * | 9/1989 | Rietsch, Jr. | ........... | 104/172.1 |
| 4,869,466 A * | 9/1989 | Isenhart | .............. | 254/394 |
| 5,562,558 A * | 10/1996 | Kubota | ............... | 474/209 |
| 6,394,260 B1 * | 5/2002 | Barth et al. | ........... | 198/799 |
| 6,938,732 B2 * | 9/2005 | Garbagnati | ........... | 184/15.1 |
| 6,978,886 B2 * | 12/2005 | Karnes | ............... | 198/852 |
| 7,080,728 B2 * | 7/2006 | Gunston | ............. | 198/731 |

* cited by examiner

*Primary Examiner*—Douglas A Hess
(74) *Attorney, Agent, or Firm*—Kajane McManus

(57) ABSTRACT

The forged chain link assembly comprises a forged chain link having a male end and a female end which cooperates with an opposite end of an adjacent link to form a chain, each end having a bore therein which cooperates with a bore in the opposite end of an adjacent link for receiving a hollow sleeve and bolt assembly therein for creating a forged link chain wherein the links pivot relative to each other, a hollow sleeve of the hollow sleeve and bolt assembly extending through the bores, with a washer of a diameter greater than that of the bore positioned to each lateral side of the female end of a chain link, and an elongate bolt extending through each washer and a bore in the hollow sleeve and receiving a nut thereon, the hollow sleeve having a length which is not equal to a lateral extent of the female end.

4 Claims, 1 Drawing Sheet

FORGED CHAIN LINK ASSEMBLY

CROSS REFERENCE TO RELATED APPLICATIONS

This application is a CIP of U.S. application Ser. No. 10/938,916 filed Sep. 11, 2004 now U.S. Pat. No. 7,080,728 and entitled Forged Chain Link And Flight Assembly And Method Of Making Same, now allowed, the teachings of which are incorporated herein by reference.

FIELD OF THE INVENTION

The present invention relates to an assembly of forged chain links which are engaged together, using a hollow sleeve and bolt assembly comprising at least a hollow sleeve, with a bolt passing therethrough to secure the chain link ends and sleeve together in a manner allowing rotation of the sleeve relative to the chain link ends engaged thereby.

PRIOR ART

Heretofore links of a forged chain have been engaged together with a solid pin and circlip arrangement.

Such solid pin and circlip arrangement has several drawbacks.

In this respect, the hollow sleeve and bolt assembly of the present invention provides an easily visible check as to the integrity of the joint, making it more reliable than the normal solid pin and circlip arrangement where it is next to impossible to visually check if circlips have been partially closed or if damaged ones have been reused, which can result in failure.

Also, the proposed hollow sleeve and bolt assembly makes it much easier to remove links.

Further, circlips can be difficult to remove whereas the hollow sleeve and bolt assembly simply requires a pair of wrenches.

Still further, the hollow sleeve and bolt assembly is a much more consistent and reliable method of installation. Therefore, unreliable circlips will no longer be in question.

And finally, the hollow sleeve and bolt assembly is less expensive than the normal solid pin and circlip arrangement.

SUMMARY OF THE INVENTION

According to the invention there is provided a forged chain link assembly comprising a forged chain link having a male end and a female end which cooperates with an opposite end of an adjacent link to form a chain, each end having a bore therein which cooperates with a bore in the opposite end of an adjacent link for receiving a hollow sleeve and bolt assembly therein for creating a forged link chain wherein the links pivot relative to each other, a hollow sleeve of the hollow sleeve and bolt assembly extending through the bores, with a washer of a diameter greater than that of the bore positioned to each lateral side of the female end of a chain link, and an elongate bolt extending through each washer and a bore in the hollow sleeve and receiving a nut thereon, the hollow sleeve having a length which is not equal to a lateral extent of the female end.

BRIEF DESCRIPTION OF THE DRAWINGS

FIG. 2 is a perspective view of one embodiment of the hollow sleeve and bolt assembly of the present invention shown replacing the solid pin and circlip arrangement of FIG. 1.

FIG. 3 is a perspective view of a female end of a forged chain link with portions broken away to show a first embodiment of the hollow sleeve and bolt assembly of the present invention.

FIG. 4 is a perspective view of a female end of a forged chain link with portions broken away to show a second embodiment of the hollow sleeve and bolt assembly of the present invention.

FIG. 5 is a perspective view of a female end of a forged chain link with portions broken away to show a third embodiment of the hollow sleeve and bolt assembly of the present invention.

DESCRIPTION OF THE PREFERRED EMBODIMENTS

Figure 1:
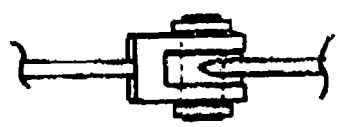
FIG. 1 is a perspective view of a prior art solid pin and circlip arrangement used to engage forged chain links together.
Figure 1:
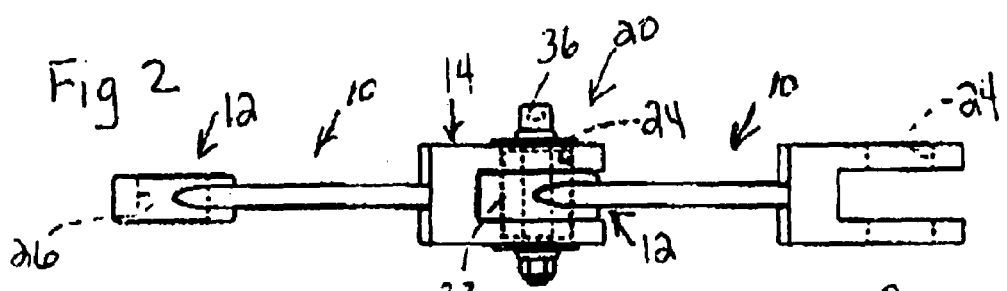
Figure 1:
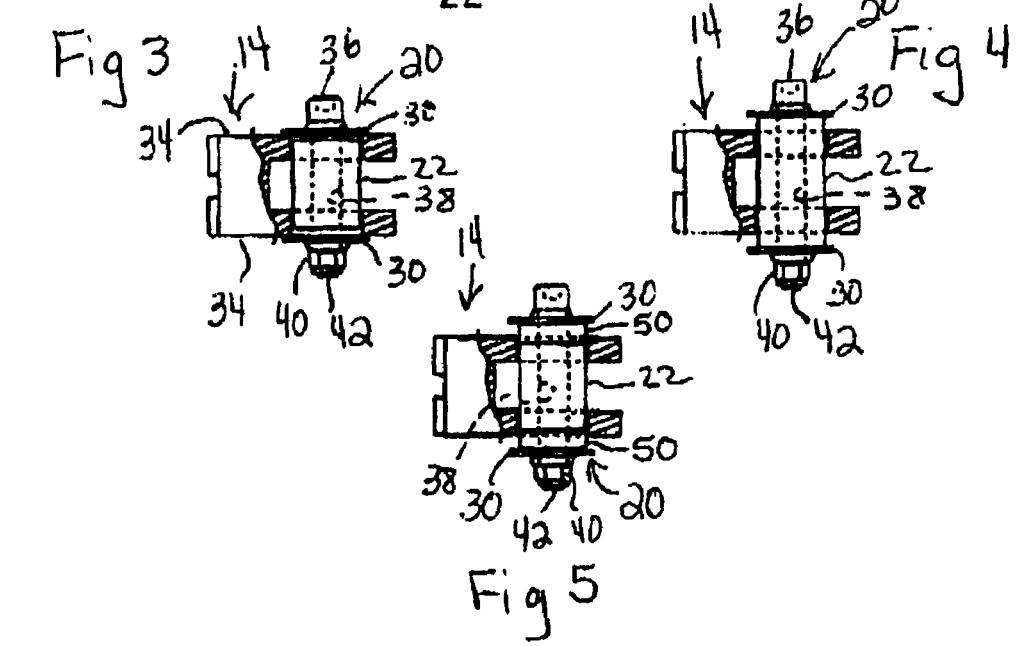

As stated above, a solid pin and circlip arrangement is presently used to join forged chain links together as shown in FIG. 1.

Turning to FIGS. 2 through 5, three exemplary embodiments of the hollow sleeve and bolt assembly of the present invention are illustrated.

Beginning with FIG. 2, two chain links 10 are illustrated therein. A male end 12 of one link 10 is shown engaged to a female end 14 of an adjacent link 10, creating a forged chain link assembly 16, by a first embodiment of hollow sleeve and bolt assembly 20, as better detailed in FIG. 3.

As best illustrated in FIG. 3, the first embodiment of the hollow sleeve and bolt assembly 20 incorporates a hollow sleeve 22 which extends slightly less than all the way through the lateral extent of the female end 14, within a connection bore 24 in the female end 14 which aligns with a cooperating connection bore 26 in the engaged male end 12 of the adjacent link 10, with the links 10 pivoting relative to each other about the hollow sleeve 22.

To maintain the hollow sleeve 22 seated within the cooperating bores 24 and 26, a stop member 30 in the exemplary form of a flat washer 30 of a diameter greater than that of the bore 24 is placed adjacent each lateral outer surface 34 of the female end 14, and a bolt 36 is slid from one side of the female end 14 through one washer 30, through a bore 38 in the hollow sleeve 22, and through another washer 30 adjacent the otherside of the female end 14, with a nut 40 being threadedly tightened onto protruding threaded end 42 of the bolt 36 to hold all the elements together and create a rotable joint between adjacent links 10.

In this embodiment, as stated above, the hollow sleeve 22 is shorter than the lateral extent of the female end 14. Due to this shorter length, the tightening of the nut 40 onto bolt end 42 does not fix the position of the hollow sleeve 22 relative to the position of the bolt 36 passing therethrough, allowing the hollow sleeve 22 to freely rotate relative to the formed joint which is advantageous for decreasing wear along the area of joining of the adjacent links 10.

In the embodiment of FIG. 4, rather than making the hollow sleeve 22 shorter than the lateral extent of the female end 14, the hollow sleeve is made longer, again to allow for rotatability relative to the formed joint.

In FIG. 5, although the shorter hollow sleeve 22 of FIG. 3 is used, lengthening, if desired, can be accomplished to provide an equivalent of the longer hollow sleeve 22 of FIG. 4 by inserting at least one spacer 50, to either end of hollow sleeve 22, into bore 24 in the female end 14, the at least one spacer 50 being of sufficient lateral extent to provide a lengthening effect to the shorter hollow sleeve 22, producing the equivalent of the longer hollow sleeve 22 of FIG. 4 by its combination with the shorter hollow sleeve 22.

It will be understood that the at least one spacer 50 has been exaggerated in width in FIG. 5 to allow visibility thereof, the spacer 50 in a preferred embodiment taking the form of a tiny washer 50.

Also, although one spacer 50 has capability to accomplish the lengthening goal, in the preferred embodiment exemplified in FIG. 5, a spacer 50 is provided against each end of hollow sleeve 22, though this should not be construed as limiting.

In essence, any length for sleeve 22, alone or in combination with at least one spacer 50, which is not equal to the width of female end 14 is suitable for use since the inequality will allow hollow sleeve 22 to rotate relative to the joint formed between adjacent links 10.

It will be understood that a primary object of the exemplary embodiments is to provide for rotatability of the hollow sleeve 22 within the joint between the adjacent links 10.

Further, the exemplary embodiments produce the desired improvements set forth hereinabove in a simple and economical manner.

Still further, the exemplary embodiments create a joint between adjacent links to form a chain link assembly which is of longer useful life due to reduction of stress on the joint because of rotatability of sleeve 22 within the joint.

As described above, the forged chain link assembly 10 of the present invention, provides a number of advantages, some of which have been described above and others of which are inherent in the invention. Also, modifications to the forged chain link assembly 10 can be proposed without departing from the teachings herein. Accordingly, the scope of the invention is only to be limited as necessitated by the accompanying claims.

The invention claimed is:

1. A forged chain link assembly comprising a forged chain link having a male end and a female end which cooperates with an opposite end of an adjacent link each end having a bore therein which cooperates with a bore in the opposite end of an adjacent link for receiving a hollow sleeve and bolt assembly therein for creating a forged link chain wherein the links pivot relative to each other, a hollow sleeve of the hollow sleeve and bolt assembly extending through the bores, with a stop member of a diameter greater than that of the bore positioned to each lateral side of the female end of a chain link, and an elongate bolt extending through each stop member and a bore in the hollow sleeve and receiving a nut thereon.

2. The assembly of claim 1 wherein the hollow sleeve is longer than the lateral extent of the female end.

3. The assembly of claim 1 wherein the hollow sleeve is slightly shorter than the lateral extent of the female end.

4. The assembly of claim 1 wherein the hollow sleeve is slightly shorter than the lateral extent of the female end and at least one spacer is positioned within the bore in the female end to either side of the hollow sleeve and extends outwardly of lateral extent of the female end.

* * * * *